United States Patent
McElroy, Jr.

(10) Patent No.: US 8,061,300 B2
(45) Date of Patent: Nov. 22, 2011

(54) ANIMAL BEHAVIORAL POSITIVE REINFORCEMENT APPARATUS AND METHOD OF USING SAME

(76) Inventor: Perry D. McElroy, Jr., Hampton, GA (US)

(*) Notice: Subject to any disclaimer, the term of this patent is extended or adjusted under 35 U.S.C. 154(b) by 92 days.

(21) Appl. No.: 12/562,103

(22) Filed: Sep. 17, 2009

(65) Prior Publication Data

US 2010/0064975 A1 Mar. 18, 2010

Related U.S. Application Data

(60) Provisional application No. 61/097,931, filed on Sep. 18, 2008.

(51) Int. Cl.
*A01K 5/01* (2006.01)
*A01K 1/035* (2006.01)
(52) U.S. Cl. ..................... 119/61.55; 119/164
(58) Field of Classification Search .......... 119/57.92, 119/61.5–61.55, 161–164, 171–172, 174, 119/712, 905, 908, 165; 47/22.1; 340/604; 220/211
See application file for complete search history.

(56) References Cited

U.S. PATENT DOCUMENTS

| | | | | |
|---|---|---|---|---|
| 3,603,290 A * | 9/1971 | O'Rork | ............... | 119/162 |
| 4,249,483 A * | 2/1981 | Sobky | ............... | 119/51.12 |
| 4,617,874 A * | 10/1986 | Zammarano | ............... | 119/51.12 |
| 6,041,737 A * | 3/2000 | Hennigan | ............... | 119/165 |
| 6,349,671 B1 * | 2/2002 | Lewis et al. | ............... | 119/51.02 |
| 6,983,719 B2 * | 1/2006 | Armstrong | ............... | 119/51.02 |
| 2006/0225659 A1 * | 10/2006 | Axelrod et al. | ............... | 119/164 |

* cited by examiner

Primary Examiner — Rob Swiatek
Assistant Examiner — Ebony Evans
(74) Attorney, Agent, or Firm — Michael L. Leetzow, P.A.

(57) ABSTRACT

A device provides positive reinforcement and treats for a domesticated animal urinating in a predetermined location. The positive reinforcement includes a message from the owner. A treat is exposed after the owner's message is played to further reward the animal. Absorbent paper is used at the predetermined location for collecting the urine and activating the voice and treat bowl. After a preset time, the used absorbent paper is removed and new absorbent paper is provided automatically. Another version includes a device that uses a single sheet of absorbent paper.

16 Claims, 14 Drawing Sheets

ANIMAL BEHAVIORAL POSITIVE REINFORCEMENT APPARATUS AND METHOD OF USING SAME

REFERENCE TO RELATED CASE

This application claims priority under 35 U.S.C. §119 (e) to provisional application Ser. No. 61/097,931, filed on Sep. 18, 2008, which is hereby incorporated by reference in its entirety.

BACKGROUND OF THE INVENTION

Field of the Invention

Training a new puppy or dog to urinate in a pre-determined area in a house requires repetition and rewards. However, the owner may not be present at all times, or may work outside the home, preventing the owner from providing positive reinforcement and treats at the appropriate time. Therefore, a device that provides the positive reinforcement and a reward to the animal at the appropriate time is needed. Additionally, a device that provides the positive reinforcement and rewards multiple times without requiring intervention from the owner may also be needed. Such a device is presented.

SUMMARY OF THE INVENTION

The present invention is directed to an animal reinforcing apparatus to reward a domestic animal for urinating in a predetermined location that includes a moisture sensing unit, and a container having a top, a base portion, and a compartmentalized tray, the compartmentalized tray for receiving at least one treat therein, the compartmentalized tray and the top capable of being rotated relative to one another upon receiving a signal from the moisture sensing unit to expose compartments in the compartmentalized tray through the top.

In some embodiments, the moisture sensing unit includes an absorbable sheet and least one pair of contacts, wherein upon a liquid being absorbed by the absorbable sheet the at least one pair of contacts become in electrical communication with one another to send a signal to the container.

In some embodiments, the moisture sensing unit includes a first roller having a supply of an elongated absorbable sheet and a second roller for accumulating used portions of the elongated absorbable sheet.

In some embodiments, the moisture sensing unit is a single pad removably attached to the base.

In some embodiments, a motor is associated with the moisture sensing unit to rotate the second roller to move the used portion away from the contacts, thereby providing a new portion of the elongated absorbable sheet adjacent the at least one pair of contacts.

In another aspect, the invention is directed to container for presenting at least one treat to a domestic animal that includes a top having an opening therein, a base portion, a compartmentalized tray disposed under the top and in the base portion, the compartmentalized tray having at least two compartments for holding the at least one treat, the compartmentalized tray and top being rotatable relative to one another to align the at least two compartments with the opening in the top thereby allowing the domestic animal to retrieve the at least one treat therefrom.

In yet another aspect, the invention is directed to an absorbable pad device for a domestic animal that includes a length of absorbable material, a first roller for storing at least a portion of the length of the absorbable material, a second roller for storing at least a portion of the absorbable material after use by the domestic animal, a base extending between the first and second rollers, and a plurality of electrical leads formed on an upper surface of the base such that when the absorbable pad is wet an electrical connection is made between at least two of the plurality of electrical leads.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
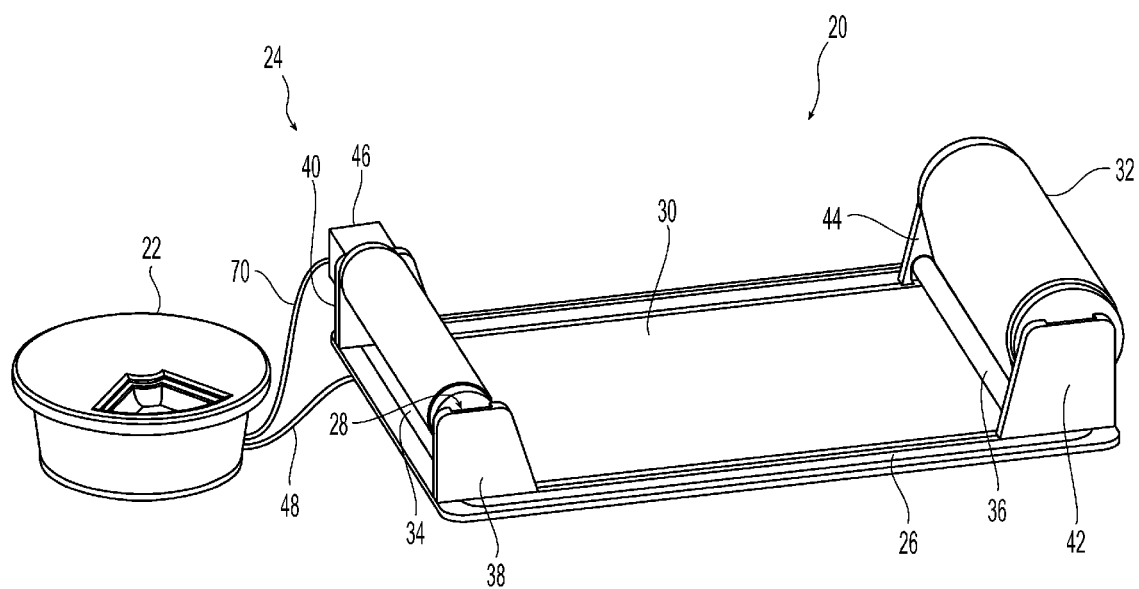
FIG. 1 is a top perspective view of one embodiment of an animal reinforcing apparatus according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, an animal reinforcing apparatus 20 has a container 22 and a moisture sensing unit 24. As described in more detail below, the container 22 preferably includes a tray with a plurality of compartments for a plurality of treats, the controller for the animal reinforcing apparatus 20, and a voice recording/playing module for recording and playing a message from the owner. One embodiment of the moisture sensing unit 24 preferably includes a base portion 26, a first roller 28 for holding a supply of absorbable paper 30 and a second roller 32 for receiving the used absorbable paper 30. The moisture sensing unit 24 also preferably has two tension bars 34,36 to hold the absorbable paper 30 flat against the base portion 26. The first roller 28 is supported by supports 38,40 and second roller 32 is supported by supports 42,44. Support 44 also includes a motor 46 to drive the second roller 32 to roll up the absorbable paper 30 after use, as described in more detail below. Electrical conductors 48 electrically connect the container 22 with the moisture sensing unit 24, as described below.

Figure 2:
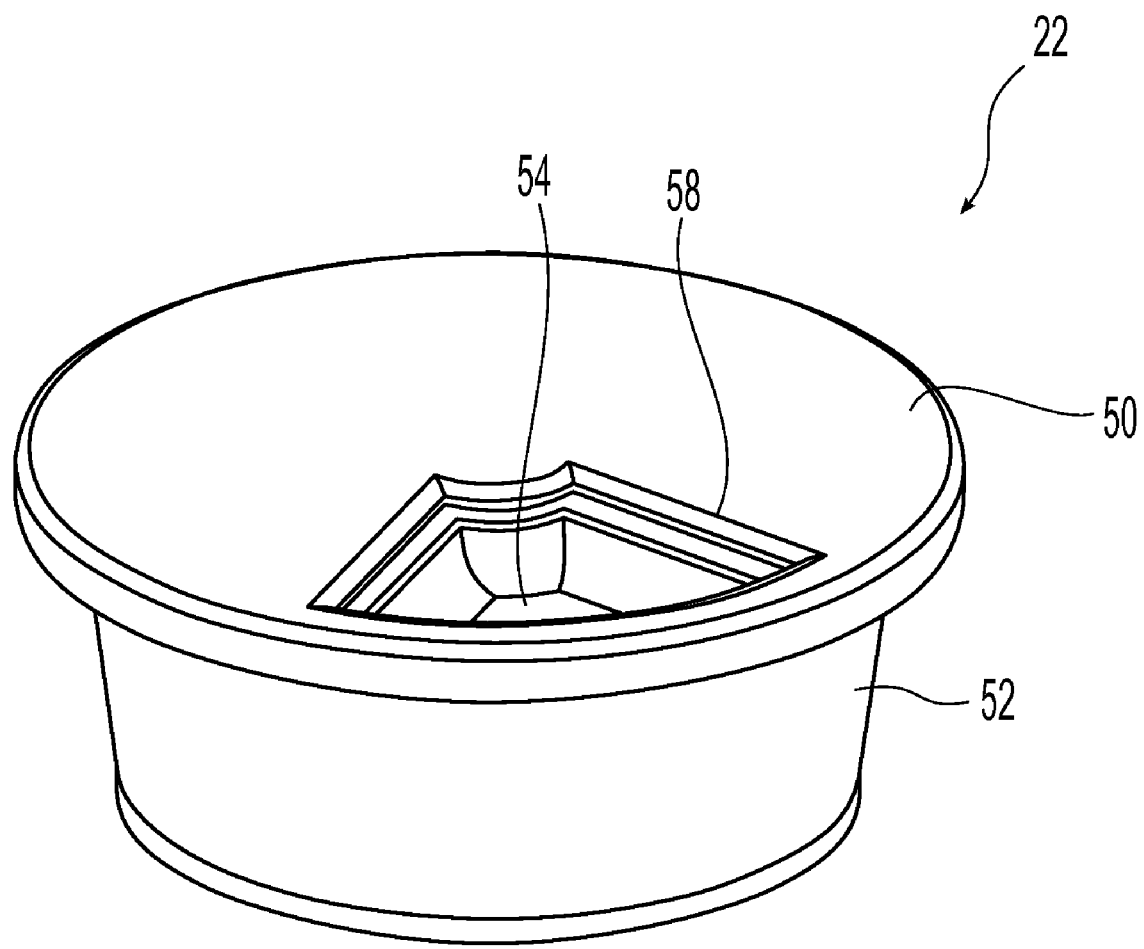
FIG. 2 is a perspective view of the container of the animal reinforcing apparatus of FIG. 1.
Figure 3:
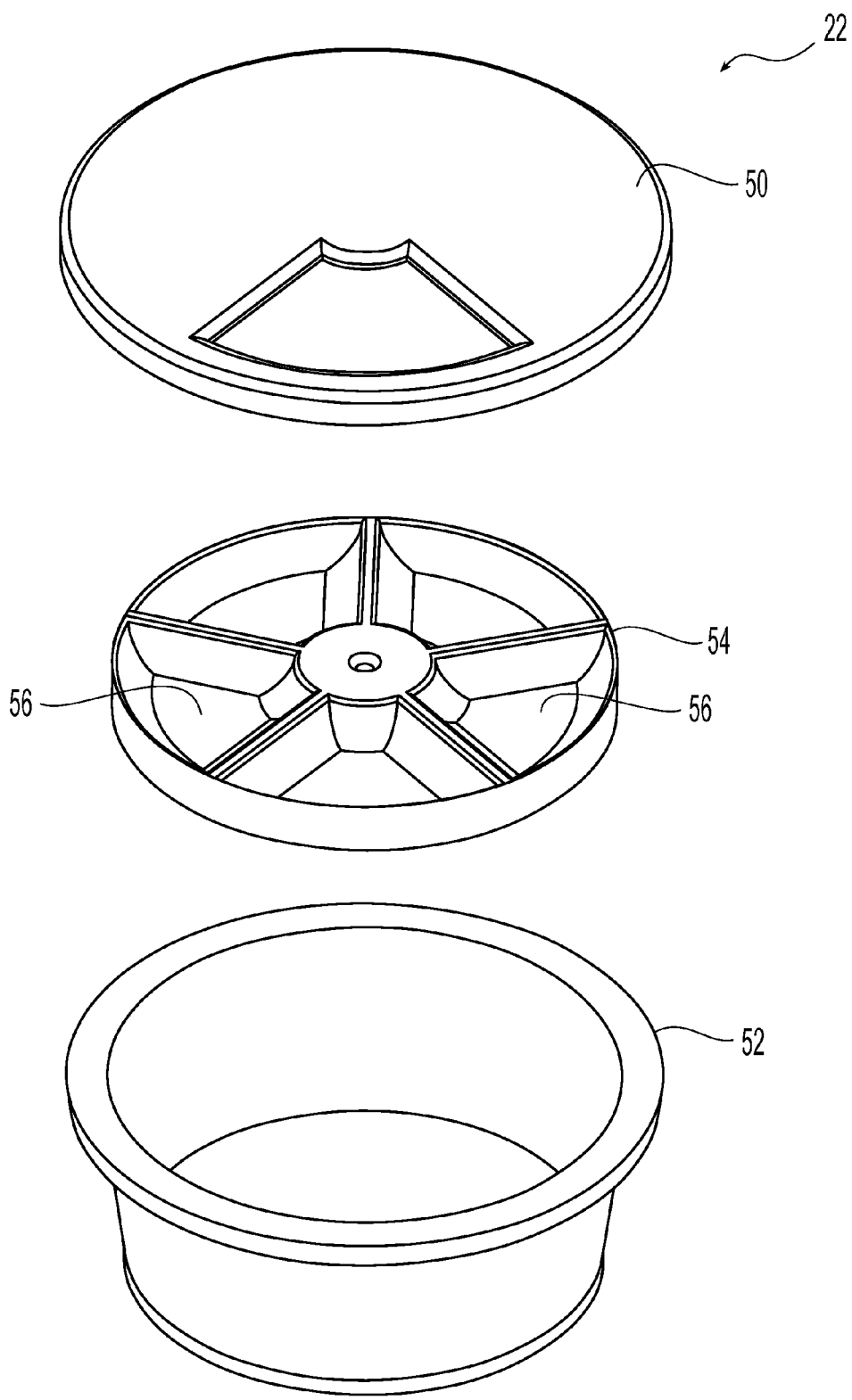
FIG. 3 is a perspective exploded view of the major components of the container of the animal reinforcing apparatus of FIG. 1.
Figure 4:
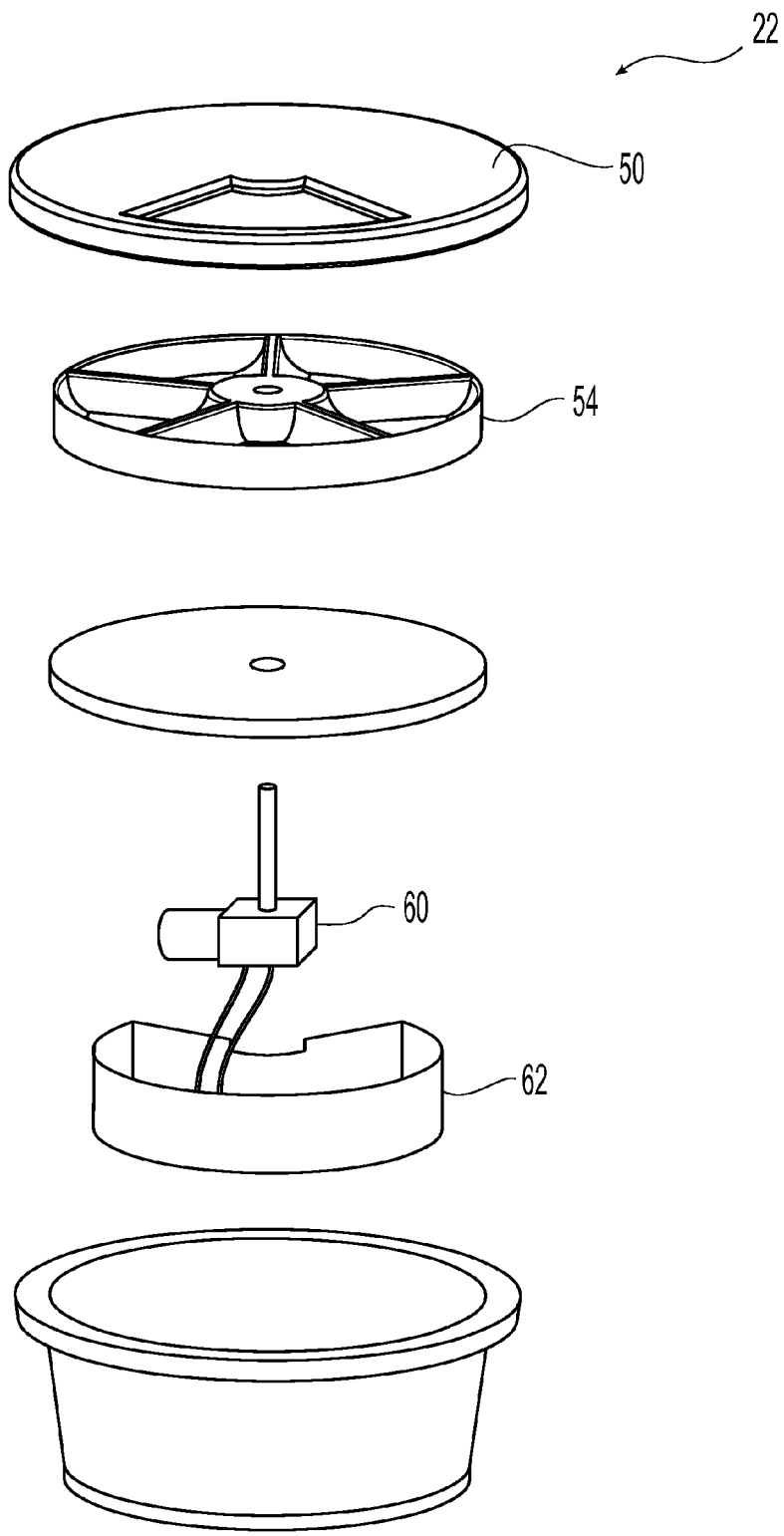
FIG. 4 is a second exploded view illustrating one drive mechanism of container of the animal reinforcing apparatus of FIG. 1.

One embodiment of container 22 is illustrated in detail in FIGS. 2-4. The container 22 includes a top 50, a base 52, and a tray 54 with a plurality of compartments 56. The top 50 and the tray 54 are capable of being rotated relative to one another. In one embodiment, the top 50 rotates about the base and the tray 54. In another embodiment, the tray 54 rotates within the base 52 and the top 50 is stationary. As illustrated best in FIG. 3, the top 50 has an opening 58 that preferably corresponds to the configuration of the compartments 56 to allow for a treat (not shown) to be presented to the domestic animal being trained.

FIG. 4 also illustrates that a drive motor 60 and the electronics 62 (preferably including a microprocessor) can be included in the base 52 of the container 22. The drive motor 60 can be operatively coupled to the tray 54 or the top 50, depending on whether the tray 54 or the top 50 is to rotate relative to the base. The electronics 62 also include a voice recorder and play module, preferably in a single module, that can record a message by the owner for the domesticated animal that will be played when activated by the animal urinating on the absorbable paper 30. Such a voice recorder/play module are readily available from a number of vendors. The drive motor 60 preferably drives either the top 50 or the tray 54 enough to only expose the next compartment 56 when activated. While this is preferably done with the electronics 62 through the microprocessor, it can also be achieved by limit or micro switches.

Figure 5:
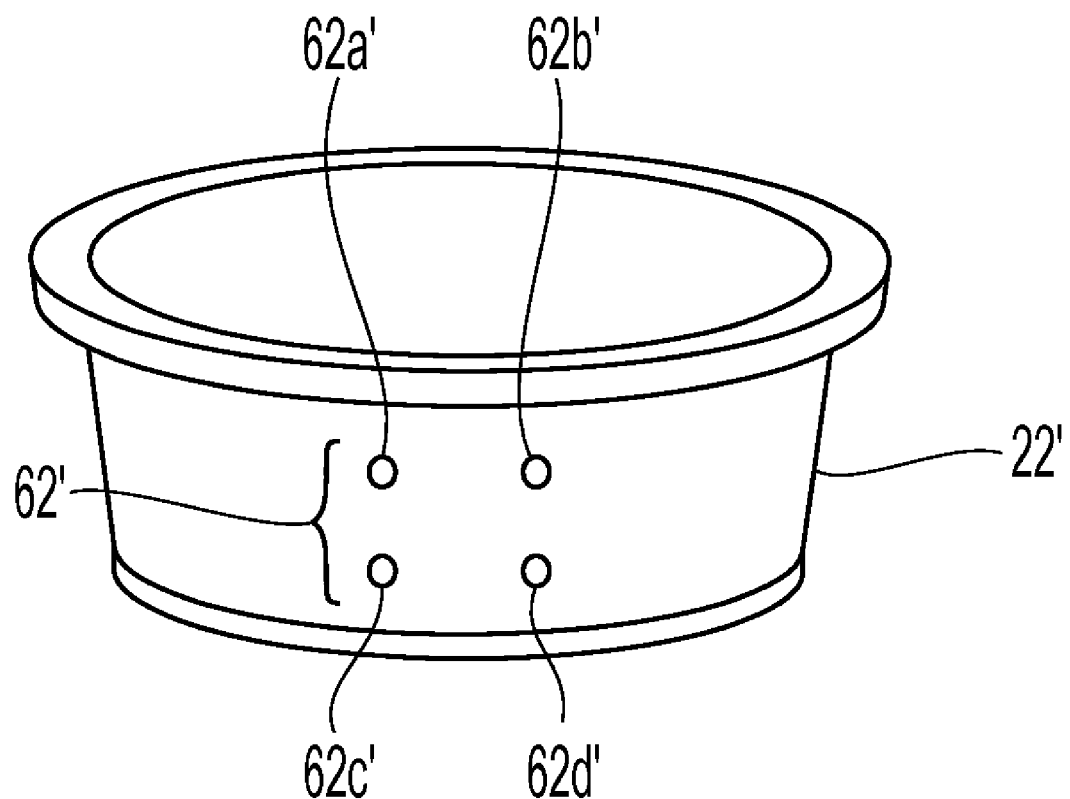
FIG. 5 is a front view of one embodiment of a base portion of a container according to the present invention.

The owner may record the message by accessing the electronics on the inside of the container 22 as illustrated in FIG. 4, on the side of the container 22' in FIG. 5, or they may even be mounted on the underside of the container, protected from accidental activation, or animal "accidents," etc. The controls 62' on container 22' include an on/off switch 62a', a record button 62b' for recording the message, a tray rotation button 62c' for rotating the tray to fill up the compartments with treats, and a play button 62d' to hear the recorded message. The speaker and microphone may be disposed in any convenient location on the container 22'.

Preferably, the top 50 and the tray 54 are removable for easy cleaning by the owner after a number of treats are used or if there is an accident or other contaminants foul the container 22.

Figure 6:
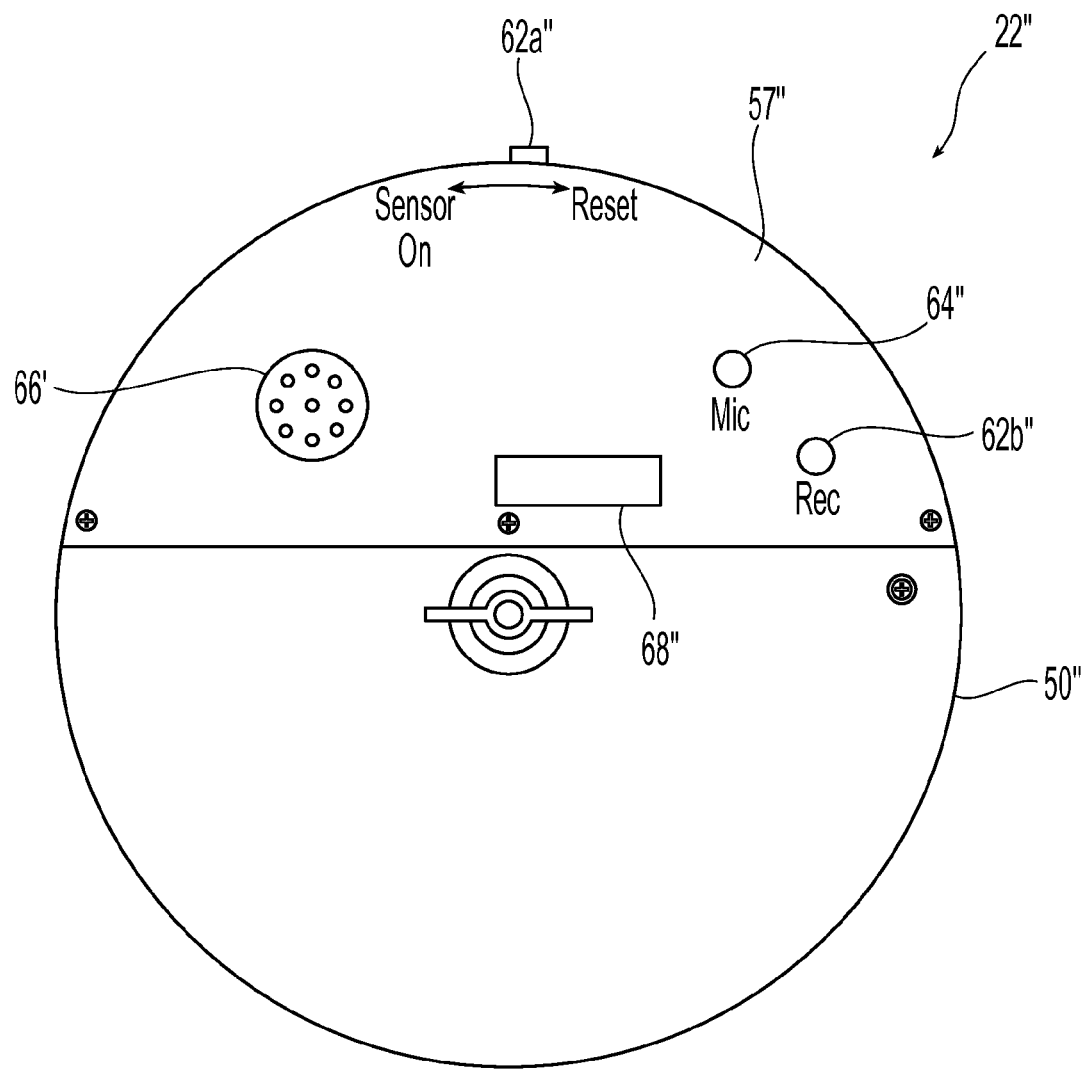
FIG. 6 is a top view of another embodiment of a container according to the present invention with the top in an open position.
Figure 7:
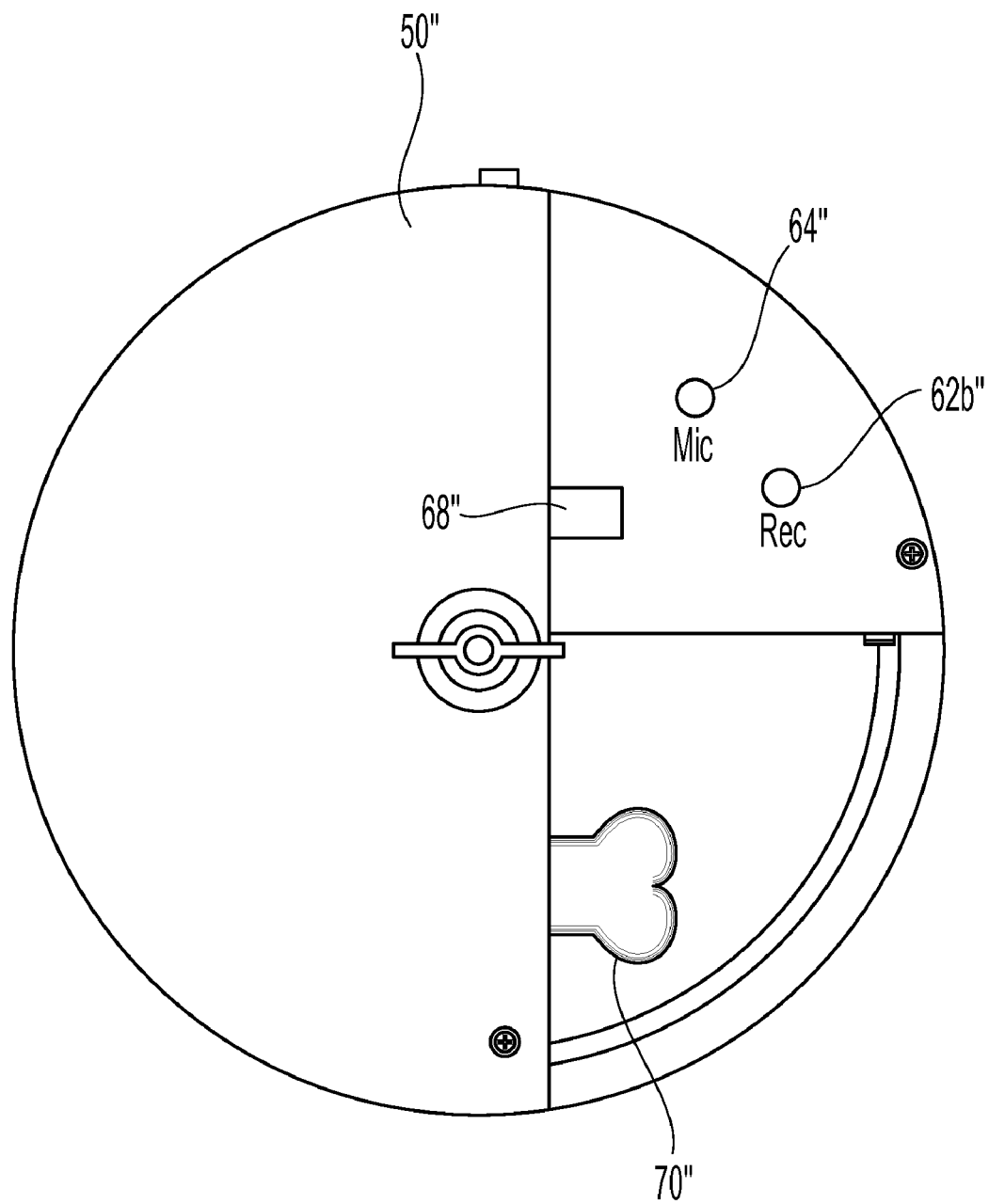
FIG. 7 is a top view of the container of FIG. 6 with the top in a second position.
Figure 8:
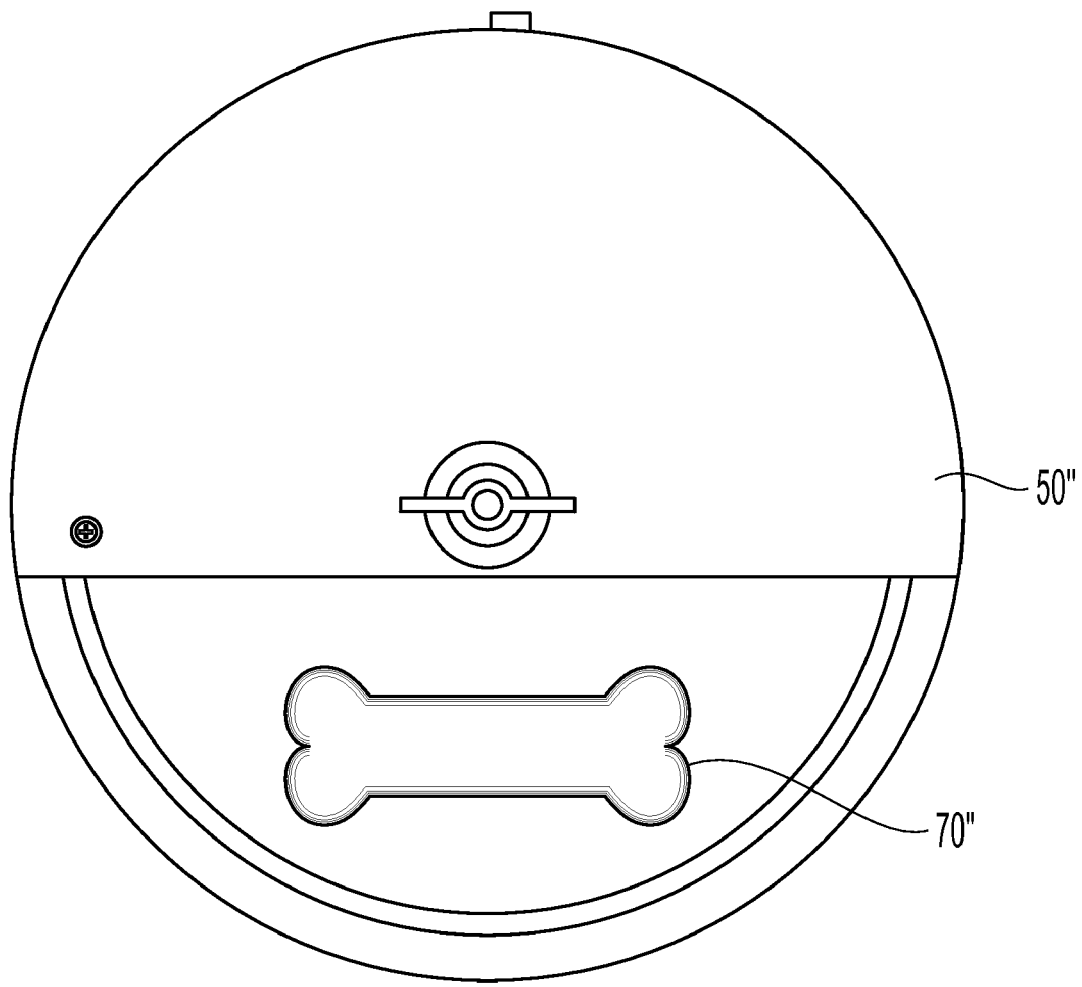
FIG. 8 is a top view of the container of FIG. 6 with the top in a third or closed position.

Another embodiment of a container 22" is illustrated in FIGS. 6-8. Container 22" is a single compartment unit with a top 50" that rotates relative to the remainder of the container 22". In FIG. 6, the top 50" is in the closed position ready for use. The container 22" also has a second portion 51" that is exposed and includes the controls for the apparatus. Included are an on/reset switch 62a", a record button 62b", a microphone 64" and a speaker 66". A limit switch 68" is present to stop the rotation of the top 50" when the top 50" pushes down thereon as it rotates. FIG. 7 illustrates the top 50" as it is rotating, but before the limit switch 68" is activated. FIG. 8 illustrates the top 50" in open position to allow the animal to retrieve the treat 70", illustrated as a dog bone, but any appropriate treat may be used.

Figure 9:
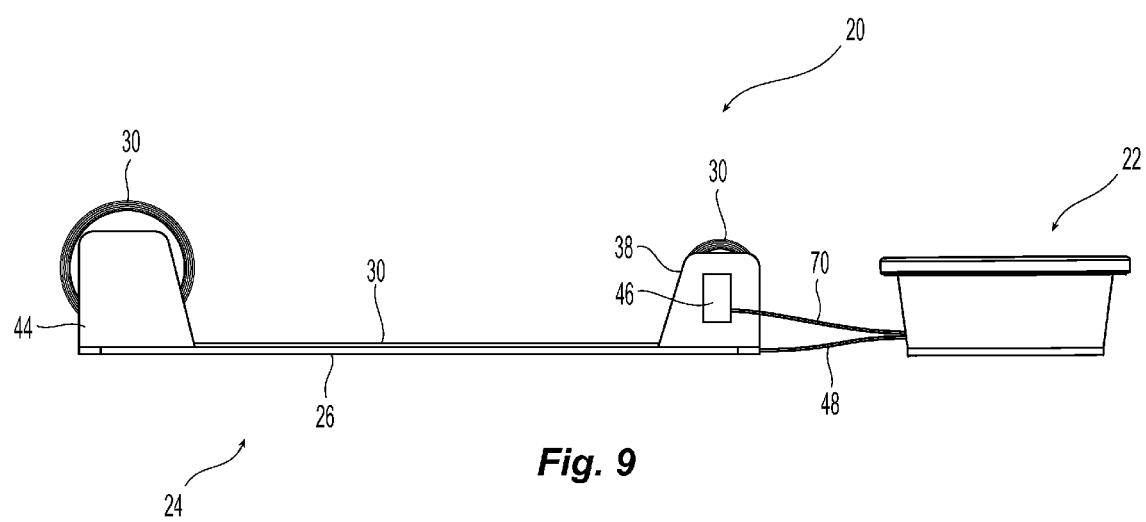
FIG. 9 is a side view of the animal reinforcing apparatus of FIG. 1.
Figure 10:
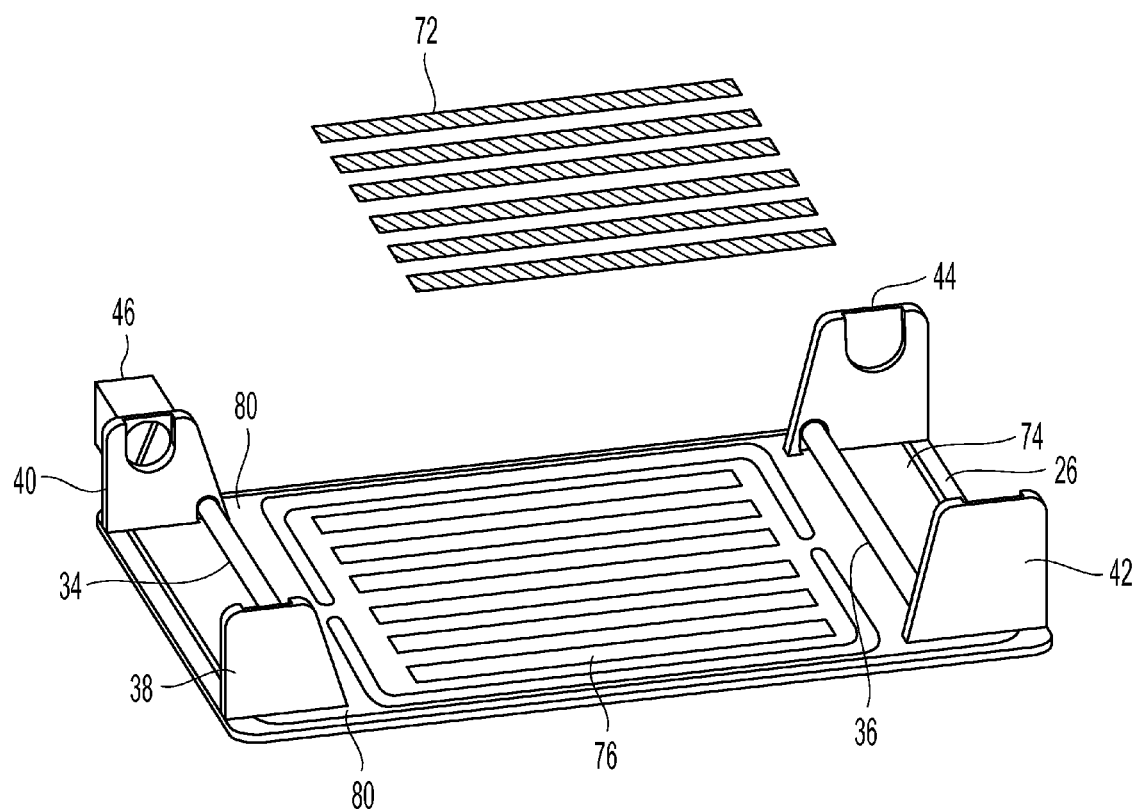
FIG. 10 is a side perspective view of the animal reinforcing apparatus of FIG. 1 with the absorbable paper removed therefrom and the contacts exploded therefrom.

FIG. 9 illustrates a side view of the animal reinforcing apparatus 20 of FIG. 1. The container 22 is electrically connected to the moisture sensing unit 24 with electrical conductors 48. The container 22 is also electrically connected to the motor 46 to drive the second roller 32 at the appropriate time by electrical conductors 70. The base portion 26 and the other components of the moisture sensing unit 24 are preferably made from ABS plastic, but any appropriate material may be used. The base portion 26 preferably has a plurality of contacts 72 that are secured to a top surface 74 of the base portion 26. More preferably, the plurality of contacts 72 are each secured in a corresponding cavity 76 in the base portion 26. See FIG. 10. The plurality of contacts 72 are preferably made of stainless steel to prevent corrosion and degradation from the animal urine and may be secured with mechanical and/or adhesives. The contacts 72 are preferably riveted to corresponding conductors on the bottom side (see FIG. 12) of the base portion 26 as well as secured with an adhesive to prevent any urine from being trapped under the contacts 72 for hygienic reasons. The plurality of contacts 72 are generally flush with the top surface 74 of base portion 26, but may also slightly extend above the top surface 74.

The base portion 26 preferably also has a liquid overflow portion 80, which is preferably an elongated cavity that extends around at least a substantial portion of the base portion 26. The liquid overflow portion 80 will retain any urine that is not absorbed by the absorbable paper 30. The liquid overflow portion 80 may be a single cavity extending around at least a portion of the periphery of the base portion 26, or may be more than one cavity and still fall within the scope of the present invention. See FIG. 10.

Figure 11:
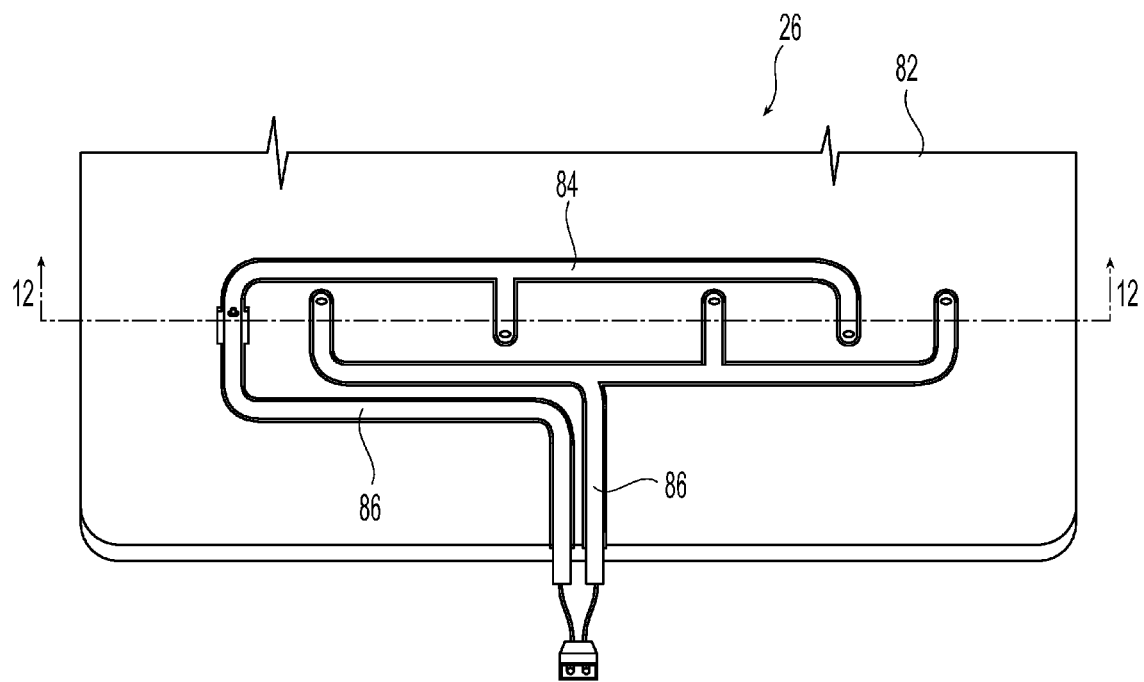
FIG. 11 is a bottom view of the moisture sensing unit.

As illustrated in FIG. 11, the bottom 82 of base portion 26 also has a cavity 84 in which electrical conductors 86 are connected to the contacts 72 through the base portion 26 by the rivets 88. As can be seen in FIG. 11, electrical conductors 86 are connected to alternating ones of the contacts 72 on the top surface 74 of the base portion 26. The electrical conductors 86 are preferably made from self-adhesive copper tape, but may be made of any suitable, electrically conductive material. The electrical conductors 86 are soldered to the electrical conductors 48 to transmit a signal to the container 22. The cavity 84 is preferably sealed to prevent contamination and to seal the electrical conductors 86.

Figure 12:
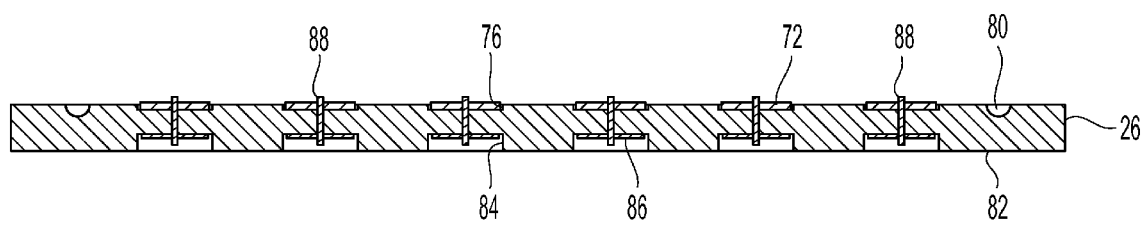
FIG. 12 is a cross-sectional view of the moisture sensing unit.

A cross-section view in FIG. 12 illustrates the relationship of the cavities 76,84 with the base portion 26. Also illustrated is the liquid overflow portion 80 to retain any liquid not absorbed during use.

The container 22 and more particularly the electronics 62 have a power supply to operate the container and electronics. The power supply may either be a battery (9V) or be plugged in with the appropriate transformer to operate the electronics and microprocessor. Thus, when an animal urinates on the absorbable paper 30, the wet absorbable paper is in contact with at least two of the contacts 72 on the top surface 74. The wet absorbable paper 30 allows for an electrical signal to pass between the adjacent contacts and, because of the arrangement of the electrical conductors 86 on the bottom 82 of the base portion 28, completes a circuit and causes the recorder to play a message from the container 22 providing positive reinforcement for the animal urinating at the proper location. Preferably there is a delay of at about 5 seconds between the completed circuit and the start of the recorded message to allow the animal to finish before its attention is drawn to the container. A longer or shorter delay may be programmed into the electronics 62. Subsequently, the electronics and in particular the microprocessor causes a treat to be presented in the opening 58 by rotating either the top 50 and the tray 54 relative to one another. The animal is then further rewarded with a treat. The electronics have yet another delay, preferably about one minute, and then the motor 46 drives the second roller 32 for a predetermined time (and therefore distance) to roll up the wet absorbable paper 30 and provide a new section of clean absorbable paper 30. The apparatus 20 then resets itself and is ready for the next time.

Figure 13:
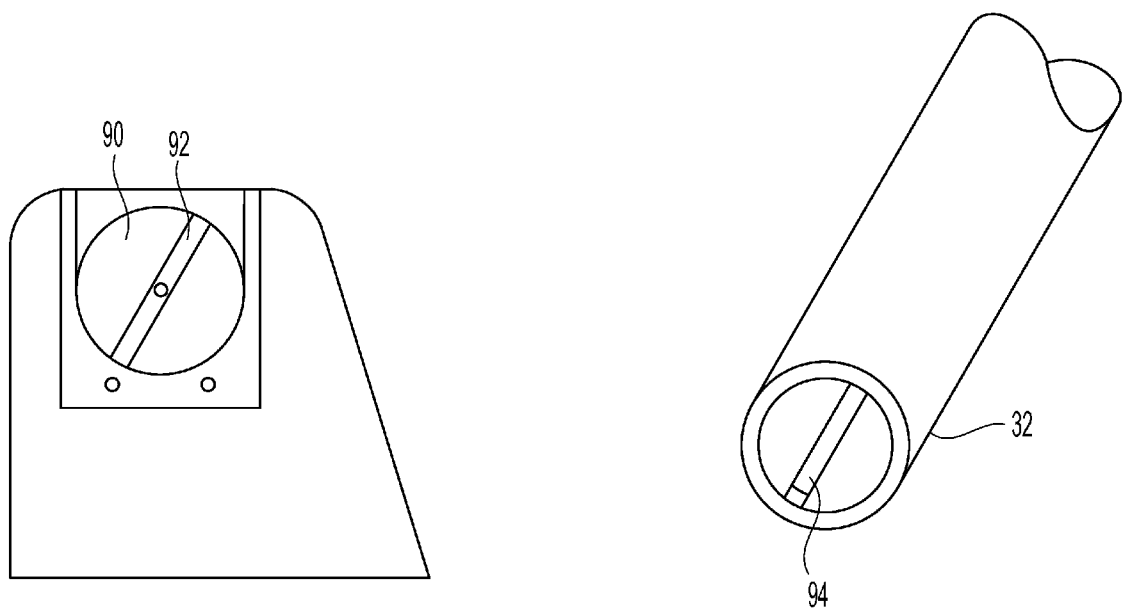
FIG. 13 is a partial view of the drive end of the second roller and the drive mechanism.

As illustrated in FIG. 13, the motor 46 is operatively connected to a drive member 90 that has an elongated projection 92 that corresponds to an elongated channel 94 in the end of the second roller 32. However, it should be noted that any configuration that allows for the motor 46 to drive the second roller 32 is acceptable. The illustrated configuration allows for easy change of the absorbable paper 30 when necessary.

Figure 14:
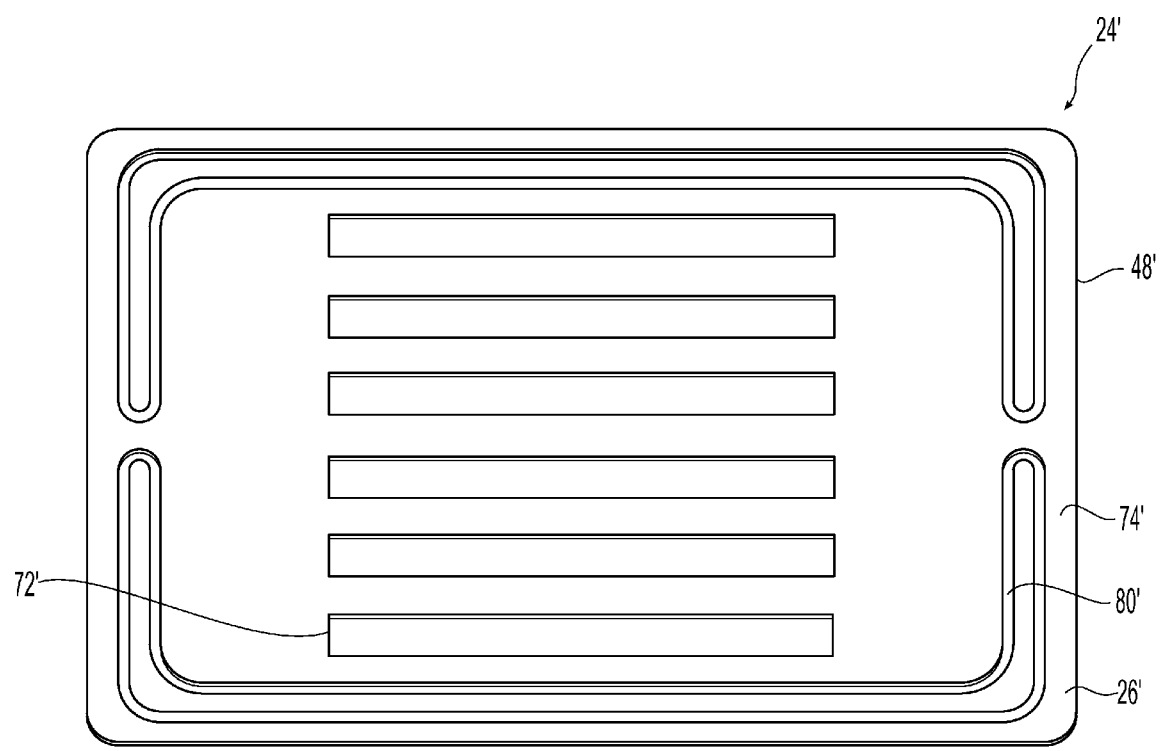
FIG. 14 is a perspective view of another embodiment of a moisture sensing unit according to the present invention.

Another embodiment of a moisture sensing unit 24' is illustrated in FIG. 14. Moisture sensing unit 24' has a base portion 26' and is electrically connected to the container with electrical conductors 48. In this embodiment, moisture sensing unit 24' has a single piece of absorbable paper (not shown) that is placed on the top surface 74' rather than having a roll of absorbable paper and associated structure to automatically replace the used absorbable paper. The base portion 26' also preferably has a plurality of contacts 72' that are secured to the top surface 74' of the base portion 26'. Similarly, the plurality of contacts 72' are each secured in a corresponding cavity 76' and are preferably made of stainless steel to prevent corrosion and degradation from the animal urine. The contacts 72' may be secured with mechanical and/or adhesives, but are preferably riveted to corresponding conductors on the bottom side of the base portion 26' as well as secured with an adhesive to prevent any urine from being trapped under the contacts 72' for hygienic reasons. The plurality of contacts 72' are generally flush with the top surface 74' of base portion 26, but may also slightly extend above the top surface 74.

The base portion 26' also preferably has a liquid overflow portion 80', which is preferably an elongated cavity that extends around at least a substantial portion of the base portion 26'. The liquid overflow portion 80' will retain any urine that is not absorbed by the absorbable paper 30'. The liquid overflow portion 80' may be a single cavity extending around at least a portion of the periphery of the base portion 26', or may be more than one cavity and still fall within the scope of the present invention. The liquid overflow portion 80' may preferably be wider and/or deeper than the liquid overflow portion 80 since there may be a chance that the animal urinates more than once before the owner changes the absorbable paper.

As will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. An absorbable pad device for a domestic animal comprising:
   a length of absorbable material;
   a first roller for storing at least a portion of the length of the absorbable material;
   a second roller for storing at least a portion of the absorbable material after use by the domestic animal;
   a base extending between the first and second rollers;
   a plurality of electrical leads formed on an upper surface of the base and disposed under the absorbable material such that when the absorbable pad is wet an electrical connection is made between at least two of the plurality of electrical leads.

2. The absorbable pad device of claim 1, wherein the second roller rotates to pull absorbable material off the first roller in response to the electrical connection between the at least two of the plurality of the electrical leads.

3. The absorbable pad device of claim 1, wherein the second roller rotates after a predetermined time interval after the formation of the electrical connection.

4. The absorbable pad device of claim 1, wherein the plurality of electrical leads form two separate electric circuits in different portions of the base.

5. The absorbable pad device of claim 1, further comprising:
   a bowl having a top, a base portion, and a tray, the tray for receiving at least one treat therein, the tray and the top being moved relative to one another upon receiving a signal from the moisture sensing unit to expose the tray through the top of the bowl.

6. The absorbable pad device of claim 5, wherein the top and tray rotate relative to one another.

7. The absorbable pad device of claim 5, further comprising a recordable medium for storing a message that plays the message upon receipt of the signal from the moisture sensing unit.

8. The absorbable pad device of claim 1, wherein the absorbable pad device further includes a liquid overflow portion to retain liquid not absorbed by the absorbable material.

9. An animal reinforcing apparatus to reward a domestic animal for urinating in a predetermined location comprising:
   a moisture sensing unit, the moisture sensing unit including a first roller having a supply of an elongated absorbable material and a second roller for accumulating used portions of the elongated absorbable material and at least one pair of contacts; and
   a bowl having a top, a base portion, and a compartmentalized tray, the compartmentalized tray for receiving at least one treat therein,
   wherein upon a liquid being absorbed by a portion of the elongated absorbable material the at least one pair of contacts become in electrical communication with one another to send a signal to the bowl, the compartmentalized tray and the top moving relative to one another upon receiving the signal from the moisture sensing unit to expose compartments in the compartmentalized tray through the top. pg,14

10. The animal reinforcing apparatus of claim 9, wherein the moisture sensing unit is divided into at least two sections, each of the at least two sections capable of sending a signal to expose a compartment through the top of the bowl.

11. The animal reinforcing apparatus of claim 9, further comprising a motor associated with the moisture sensing unit to rotate the second roller to move the used portion away from the at least one pair of contacts, thereby providing a new portion of the elongated absorbable material adjacent the at least one pair of contacts.

12. The animal reinforcing apparatus of claim 9, further comprising a recordable medium for storing a message that plays the message upon receipt of the signal from the moisture sensing unit.

13. The animal reinforcing apparatus of claim 9, wherein the moisture sensing unit further includes a liquid overflow portion to retain liquid not absorbed by the elongated absorbable material.

14. The animal reinforcing apparatus of claim 9, wherein the at least one pair of contacts are formed on an upper surface of the moisture sensing unit and disposed under the elongated absorbable material such that when the absorbable pad is wet an electrical connection is made between at least one pair of contacts.

15. The animal reinforcing apparatus of claim 9, wherein the second roller rotates to pull the elongated absorbable material off the first roller in response to the electrical communication between the at least one pair of contacts.

16. The animal reinforcing apparatus of claim 9, wherein the second roller rotates after a predetermined time interval after the electrical communication.

* * * * *